Nov. 25, 1969  KARL-FRIEDRICH LUFT  3,479,860

OXYGEN DETERMINATION

Filed May 22, 1967

INVENTOR

Karl Friedrich Luft by Fraser, Wilson & Fraser attorneys

United States Patent Office 3,479,860
Patented Nov. 25, 1969

3,479,860
OXYGEN DETERMINATION
Karl-Friedrich Luft, Essen, Germany, assignor to Bergwerksverband G.m.b.H., Essen, Germany, a German company
Filed May 22, 1967, Ser. No. 640,006
Claims priority, application Germany, June 15, 1966, B 87,556
Int. Cl. G01n 31/00
U.S. Cl. 73—27                                    2 Claims

ABSTRACT OF THE DISCLOSURE

The specification describes an improved gas flow measuring system for use in portable apparatus for determining oxygen in gas mixtures using its paramagnetism. In the flow measuring system two electrically heated resistors forming the two halves of a bridge circuit are placed in the limbs of two identical duct systems through which the gas flows cooling the resistances and upsetting the bridge balance. The use of identical duct systems prevents acceleration effects, due for example to lifting the apparatus, from disturbing the bridge balance.

---

The present invention relates to instruments for indicating the oxygen content of a first gas and comprising means for producing a magnetic field, means for passing the first gas and a second gas of calibrated oxygen content into the magnetic field, a duct system for the second gas, two flow-measuring electrical resistances in the duct system for measuring the flow of the second gas, and electrical indicating means responsive to changes in the ohmic values of the resistances brought about by the flow of the second gas over them in accordance with a differential effect of the magnetic field on the flow characteristics of the two gases.

In such instruments, for example in that described in the British patent specification 1,040,707 and the corresponding United States specification 3,287,959, the resistances form parts of a Wheatstone bridge.

A principal object of the construction adopted in the instrument described in the two above-mentioned patent specifications was to arrange the duct system in such a manner as to compensate for the influence of lift and acceleration, thus making the instrument suitable for applications where portability is required.

In the earlier instrument atmospheric air was used as the second gas which had a constant oxygen content and air was allowed to pass through a protective cap into the instrument. A disadvantage of this was that when the air flowed the effect of the air movement was to disturb the flow produced by the magnetic field.

One object of the present invention is to improve an instrument of the type referred to above, more particularly in regard to reducing the effect of swinging, i.e. turning the instrument when it is being carried, and to reduce the effect of flow in the first gas.

In an instrument for indicating the oxygen content of a first gas, comprising means for producing a magnetic field, means for passing the first gas and a second gas of calibrated oxygen content into the magnetic field, a duct system for the second gas, two flow-measuring electrical resistances in the duct system for measuring the flow of the second gas, and electrical indicating means responsive to changes in the ohmic values of the resistances brought about by the flow of the second gas over them in accordance with a differential effect of the magnetic field on the flow characteristics of the two gases, the present invention provides the improvement that the instrument further comprises a substantially linear duct for the first gas and two such duct systems, each with two such resistances mounted in it, the two such duct systems being constructed and arranged on the two sides of the linear duct in the manner of mirror images.

It has been found that an instrument embodying the invention is quite insensitive to rotational movements about the axis of the linear duct for the first gas so that consequently, the instrument is less affected by shaking than the previous instrument.

In accordance with a preferred embodiment of the invention each such duct system includes three interconnected parallel ducts which all open into the linear duct, the two outermost of the three ducts opening into the linear duct outside the magnetic field, and having trimming valves for adjustment of their resistance to gas flow. That is to say each duct system is similar in form to a capital E with the middle limb opening through the magnetic field between the pole pieces of a magnet while the other parallel limbs open into the linear duct outside the magnetic field. Owing to this feature disturbances due to flow in the first gas, that is to say the gas whose oxygen content is to be measured, are prevented.

In order that those skilled in the art may make use of the invention, embodiments of it are now described with reference to the accompanying diagrammatic drawings.

Figure 1:
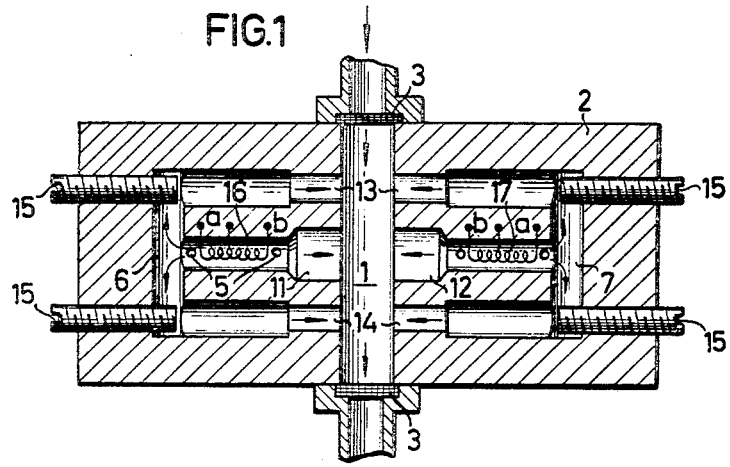
FIG. 1 shows an instrument embodying the invention in section.
Figure 2:
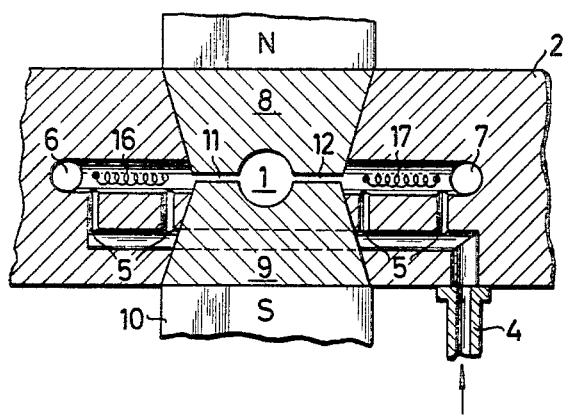
FIG. 2 shows a further section of the instrument perpendicular to the section of FIG. 1.

In the FIGURES 1 and 2 reference numeral 2 denotes the body of the instrument which comprises a substantially linear duct 1 for the first gas, that is to say the gas whose oxygen content is to be determined and indicated. The inlet and outlet and the ends of the duct 1 are covered by filters in the form of fine wire netting or sintered metal material. The second gas, whose oxygen content is known or calibrated, and can therefore be used as a basis for comparison, is supplied through pipe connections 4 and four identical capillary ducts 5 of two substantially E-shaped duct systems 6 and 7 which are arranged in the manner of mirror images about the duct 1. The central limb of each of these systems opens through gaps 11 and 12 in the channel 1 containing the first gas whose oxygen content is to be measured. The gaps 11 and 12 are between the pole pieces 8 and 9 of a magnet 10. The outer limbs of the duct systems for the second gas also lead through gaps 13 and 14 into the duct or channel 1 for the first gas.

The two duct systems 6 and 7 for the second or comparison gas, and in particular the outlet gaps 11 to 14, are so dimensioned that after setting trimming valves in the form of screws 15, the comparison gas emerging through the openings of the capillary ducts 5 on its way through the magnetic gaps 11 and 12, on one hand, and the gaps 13 and 14, on the other hand, meet with the same resistance to flow.

Therefore the flows of the second gas emerging from the capillary ducts 5 are all equal. If the oxygen contents, and consequently volume susceptibilities of the first and second gases are the same, there is no transverse flow along the central limbs so that there is no cooling effect on the flow measuring resistances 16 and 17 arranged in these limbs.

Figure 3:
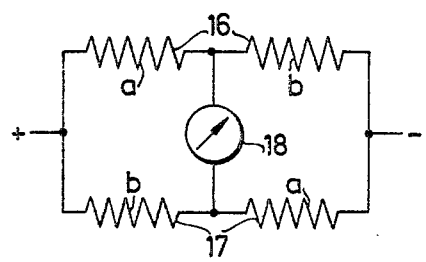
FIG. 3 is a circuit diagram.

If, however, for example the oxygen content of the first gas flowing in duct 1 is greater than that of the comparison or second gas flowing in the duct systems 6 and 7, owing to the difference in susceptibility there is a differential pressure in the gaps 11 and 12 owing to the magnetic effect and therefore there is a variation in the flow rates with the result that less of the comparison gas emerges from the magnet gaps 11 and 12 and more comparison gas emerges through the gaps 13 and 14. Therefore a corresponding part of the comparison gas emerging from the capillary ducts 5 passes over the resistances 16 and 17 with the result that the temperature equilibria are upset in two resistances, denoted in the drawing by $a$ and $b$, and making up the resistances 16 and 17 so that the indicating device 18 registers a corresponding reading (see FIG. 3) as shown in FIG. 3; resistances 16 and 17, each made up of two resistances $a$ and $b$, form a Wheatstone bridge. With the circuit arrangement the resistances $a$ and $b$ which are preferentially cooled by the gas flow, and form opposite members of the bridge circuit, add together so that the total effect on the device 18 is twice that which would occur if only one resistance $b$ were cooled. If on the other hand, owing to inclination of the instrument body 2 there is thermal convection in the resistances 16 and 17, for example from left to right in the plane of the drawing, the resistances $a$ in resistance 16 and $b$ in resistance 17 will be preferentially cooled to an equal degree. However since these resistances form conjugate limbs of the bridge circuit the balance of the circuit is not affected.

The same applies for disturbances due to inertia effects when the instrument is moved.

Figure 4:
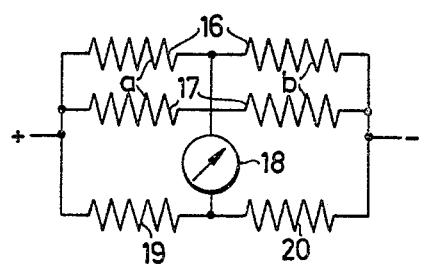
FIG. 4 shows a further circuit diagram from a further embodiment of the invention.

A further possibility for connecting the resistances 16 and 17 is shown in FIG. 4, which in combination with the fixed resistances 19 and 20 provides for adaptation to indicating devices 18 having a low internal resistance. The effects of thermal convection and inertia are also circumvented in this instrument.

An advantage of the instrument is that disturbances due to the flow of the first gas are completely prevented by the symmetrical arrangement. The pressure gradient along the duct 1 has no effect since the pressure differences obtaining between the magnet gaps 11 and 12 on the one hand and 13 and 14 on the other hand are oppositely directed and their effect on the flow of the second or comparison gas is zero.

The following description of the instrument with reference to numerical data is intended to indicate the utility of the invention.

An embodiment of the invention as shown in FIGS. 1 and 2 had magnet gaps 11 and 12 with dimensions of 10 x 10 x 1 mm. and a magnetic field strength of about 19,000 oe. The flow in four capillary ducts 5 was 5 cc. per minute, that is to say the total flow was 20 cc. per minute while the flow of the first gas passing along the duct 1 was set at about 300 cc. per minute. The resistances 16 and 17 were made of nickel wire and had a surface temperature of 100° C., the power required for this being 0.5 w.

With a difference in the oxygen content between the first and second gases of 1% $O_2$ the voltage appearing across the diagonal of the bridge was about 20 mv. Using a graphic recorder of the compensation type as the device 18 and which measured from 0 to 2 mv., differences as little as 0.001% $O_2$ could be accurately detected. The screws 15 constituting the trimming valves were so set that the zero point remained the same despite wide differences in the flow of the two gases. The indication of the oxygen difference was however dependent upon the flow: with a low speed of flow for the comparison gas the influence of the diffusion of the gas to be measured into the comparison gas duct systems was noticeable, while with higher rates of flow for the comparison gas the influence of mixing effects was noted. Since these influences counteract each other, however, optimum flow conditions can be set, in the case chosen approximately equal to the values given above, so that with an alteration of the flows of the first and second gases of ±10%, the value indicated was less than 1%. In this case it was a question of conditions which could be achieved substantially without any additional technical complications.

A further advantage of the arrangement, besides the high sensitivity just described, is the independence of the readings from non-magnetic properties of the first gas, such as thermal conductivity, specific heat and viscosity. If for example the gas used for comparison is nitrogen and the gas whose oxygen content is to be measured is a mixture from nitrogen and carbon dioxide, at the transition from nitrogen to oxygen there is a displacement in the zero point in accordance with the difference in the diamagnetic susceptibilities of the two gases.

On the other hand it is possible to apply the dependence of the measured reading from the non-magnetic properties of the comparison gas in a useful manner. If for example small oxygen contents in waste gases are to be measured, it is advantageous to use carbon dioxide as the comparison gas instead of nitrogen with the result that, owing to the higher specific heat and lower viscosity and thermal conductivity the sensitivity of measurement increases by a factor of 1.7.

In general instruments as described above permit an accurate and consistent method of measuring differences between oxygen contents of gases. The instruments are capable of a wide range of application. In many problems the use of a comparison gas presents no complication whatsoever since variations in the oxygen content of one and the same gas, for example in atmospheric air, must be measured. This applies for example for the examination of oxidation reactions and in biological processes such as assimilation or respiration.

While some forms of the invention have been described so that those skilled in the art may take full advantage of the invention, it is to be understood that such specific forms of the invention have been given by way of example only and that the scope of protection claimed for the invention is to be interpreted in accordance with the gist and spirit of the following patent claims.

I claim:
1. Portable measuring apparatus for determining or comparing the oxygen content of gases comprising a body having a linear duct for the first gas whose oxygen content is to be determined, means for delivering to said body a second gas whose oxygen content is known, a pair of E-shaped duct systems arranged in the manner of mirror images about said first duct for receiving said second gas, the central limb of each of said duct systems opening into said first duct through gaps between pole pieces of a magnet, the outer limbs of said duct systems for said second gas leading through gaps outside the magnetic field to said first duct, resistors in the central limb of each duct system for measuring the flow of said second gas, and electrical indicating means responsive to changes in the ohmic values of said resistors brought about by the flow of said second gas over them in accordance with a differential effect of the magnetic field on the flow characteristics of the two gases.

2. Portable measuring apparatus as claimed in claim 1, comprising trimming valves for fine adjustment of the resistance of said outer limbs of said duct systems to gas flow.

References Cited
UNITED STATES PATENTS 2,903,883   9/1959   Luft _____ 73—27.5
3,287,959   11/1966  Luft _____ 73—27.5

RICHARD C. QUEISSER, Primary Examiner

J. K. LUNSFORD, Assistant Examiner